(12) United States Patent
Hirabayashi et al.

(10) Patent No.: US 7,180,698 B2
(45) Date of Patent: Feb. 20, 2007

(54) MAGNETIC RECORDING AND REPRODUCTION APPARATUS

(75) Inventors: Koichiro Hirabayashi, Osaka (JP); Hiroshi Kanchiku, Nara (JP); Hitoshi Yasutomi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 447 days.

(21) Appl. No.: 10/802,238

(22) Filed: Mar. 17, 2004

(65) Prior Publication Data

US 2004/0212918 A1    Oct. 28, 2004

(30) Foreign Application Priority Data

Mar. 19, 2003    (JP)    ............... 2003-075674

(51) Int. Cl.
*G11B 15/28*    (2006.01)
(52) U.S. Cl. .................... 360/85; 360/130.32
(58) Field of Classification Search .............. 360/84, 360/85, 130.32
See application file for complete search history.

(56) References Cited

U.S. PATENT DOCUMENTS

| | | | | |
|---|---|---|---|---|
| 4,231,504 A | * | 11/1980 | Ketzer | ............ 226/180 |
| 4,438,879 A | * | 3/1984 | Rudi | ............ 226/188 |
| 4,506,857 A | * | 3/1985 | Hara et al. | ............ 248/655 |
| 4,649,306 A | * | 3/1987 | Yamashita | ............ 310/90 |
| 4,701,816 A | * | 10/1987 | Ida | ............ 360/96.4 |
| 5,065,264 A | * | 11/1991 | Ohmori et al. | ............ 360/85 |
| 5,744,886 A | * | 4/1998 | An | ............ 310/91 |
| 6,073,826 A | * | 6/2000 | Nagasaki et al. | ............ 226/180 |
| 6,398,095 B1 | * | 6/2002 | Tatsumi et al. | ............ 226/180 |

FOREIGN PATENT DOCUMENTS

| | | | |
|---|---|---|---|
| EP | 1117097 A2 | * | 7/2001 |
| JP | 04210759 A | * | 7/1992 |
| JP | 11328779 A | * | 11/1999 |
| JP | 2000187906 A | * | 7/2000 |
| JP | 2000187907 A | * | 7/2000 |

* cited by examiner

*Primary Examiner*—William J Klimowicz
(74) *Attorney, Agent, or Firm*—Renner, Otto, Boisselle & Sklar, LLP

(57) ABSTRACT

A magnetic recording and reproduction apparatus according to the present invention includes a cylinder for recording information to and/or reproducing information from a magnetic tape; a chassis section having a first chassis surface having the cylinder provided thereon and a second chassis surface substantially perpendicular to the first chassis surface; a capstan section for driving the magnetic tape so as to run, the capstan section being provided on the first chassis surface; and a securing section for securing the capstan section to the chassis section, the securing section being provided on the second chassis surface.

9 Claims, 7 Drawing Sheets

MAGNETIC RECORDING AND REPRODUCTION APPARATUS

This non-provisional application claims priority under 35 U.S.C., §119(a), on Patent Application No. 2003-075674 filed in Japan on Mar. 19, 2003, the entire contents of which are hereby incorporated by reference.

BACKGROUND OF THE INVENTION

1. Field of the Invention

The present invention relates to a magnetic recording and reproduction apparatus which is compact and lightweight and is superb in productivity.

2. Description of the Related Art

Recently, the reduction of the size, weight and production cost of magnetic recording and reproduction apparatuses has become desirable.

Hereinafter, a conventional magnetic recording and reproduction apparatus will be described.

A conventional magnetic recording and reproduction apparatus as described in Japanese Laid-Open Publication No. 11-328779 is known.

This conventional magnetic recording and reproduction apparatus has the following problems.

1. As shown in FIG. 4 of Japanese Laid-Open Publication No. 11-328779, a substrate 6 is provided above a housing 9 of a capstan motor, and the heads of tightening screws 14, 15 and 17 and the head of an adjusting screw 16 are on a top surface of the substrate 6. Due to such a structure, the magnetic recording and reproduction apparatus cannot be reduced in thickness.

2. A portion of the substrate 6 to which the housing 9 is to be fixed needs to be sufficiently thick to be rigid against the pressure-contact force of the pinch roller. Thus, the shape of the magnetic recording and reproduction apparatus is inevitably complicated.

3. In order to adjust the tilt of a capstan shaft 8, a dedicated adjusting screw 16 is required.

SUMMARY OF THE INVENTION

A magnetic recording and reproduction apparatus according to the present invention includes a cylinder for recording information to and/or reproducing information from a magnetic tape; a chassis section having a first chassis surface having the cylinder provided thereon and a second chassis surface substantially perpendicular to the first chassis surface; a capstan section for driving the magnetic tape so as to run, the capstan section being provided on the first chassis surface; and a securing section for securing the capstan section to the chassis section, the securing section being provided on the second chassis surface.

In one embodiment of the invention the magnetic recording and reproduction apparatus further includes a pinch roller for pressing the magnetic tape to the capstan section toward the second chassis surface.

In one embodiment of the invention, the magnetic recording and reproduction apparatus includes a third chassis surface substantially perpendicular to the first chassis surface and the second chassis surface.

In one embodiment of the invention, the capstan section includes a pivoting adjusting section for pivoting the capstan section along a plane parallel to the second chassis surface so as to adjust a tilt of the capstan section. The second chassis surface has an engaging section engageable with the pivoting adjusting section.

In one embodiment of the invention, the pivoting adjusting section pivots in accordance with the pivoting of the capstan section. The center of pivoting of the pivoting adjusting section substantially matches a phantom line perpendicular to the second surface and passing through the center of a part of the magnetic tape which is in contact with the pinch roller.

In one embodiment of the invention, the magnetic recording and reproduction apparatus further includes a relative position adjusting section for adjusting the tilt of the capstan section.

In one embodiment of the invention, the relative position adjusting section is at least one cutout formed in a part of the second chassis surface in the vicinity of the capstan section.

In one embodiment of the invention, the magnetic recording and reproduction apparatus further includes a flapping adjusting section for adjusting a tilt of the capstan section so as to tilt the capstan section along a plane which is perpendicular to the first chassis surface and the second chassis surface.

In one embodiment of the invention, the second chassis surface has at least one screw hole. The flapping adjusting section is at least one screw. The at least one screw passes through the at least one screw hole to press the capstan section so as to adjust the tilt of the capstan section.

In a magnetic recording and reproduction apparatus according to the present invention, a capstan housing is secured on a surface substantially perpendicular to the first surface of the chassis section.

Owing to such a structure, no components are provided on the capstan section. Thus, the magnetic recording and reproduction apparatus can be reduced in thickness.

Thus, the invention described herein makes possible the advantages of providing a magnetic recording and reproduction apparatus which is compact and lightweight with a simple structure and is cost-effective.

These and other advantages of the present invention will become apparent to those skilled in the art upon reading and understanding the following detailed description with reference to the accompanying figures.

DESCRIPTION OF THE PREFERRED EMBODIMENTS

Figure 1:
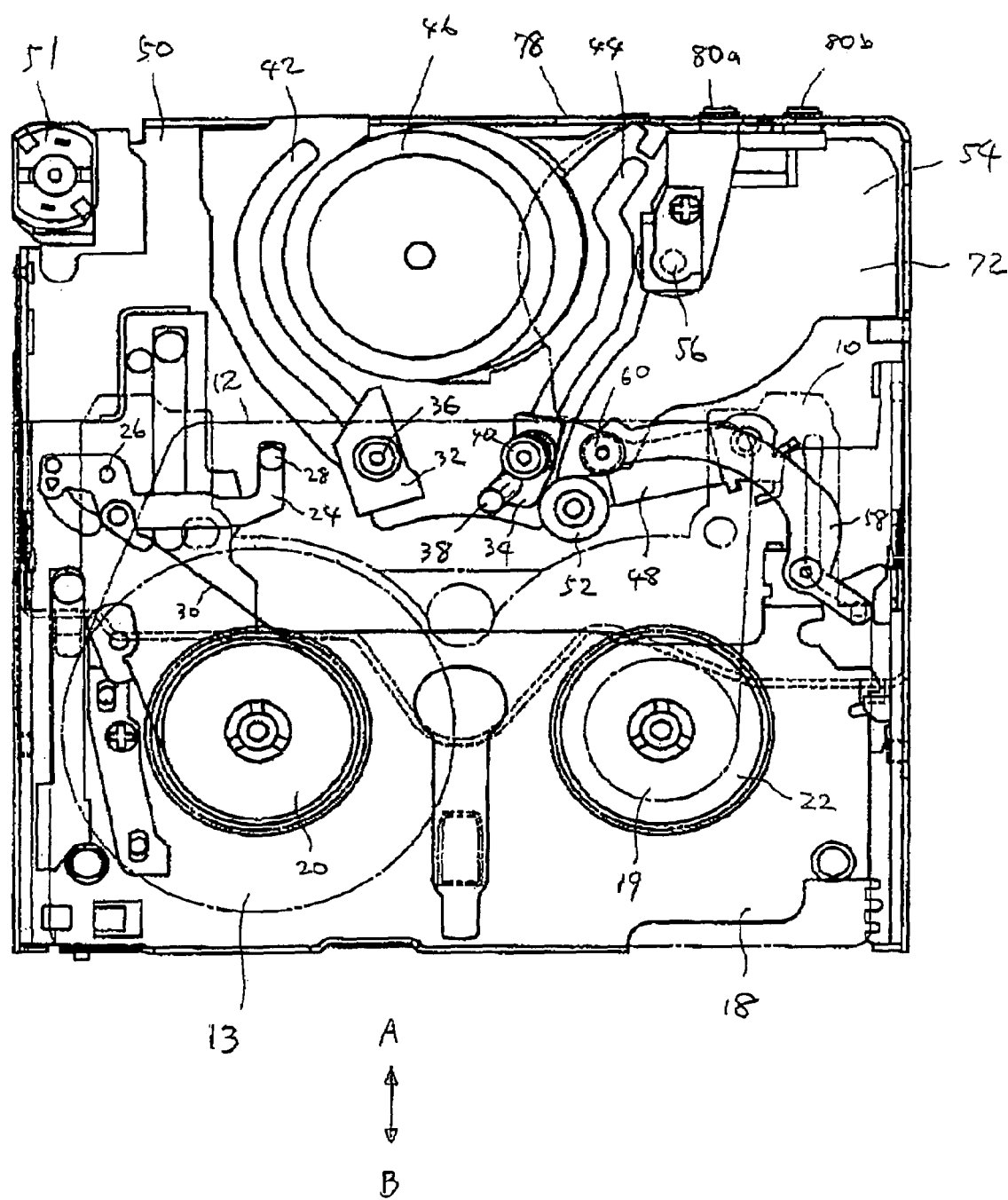
FIG. 1 is a plan view of a magnetic recording and reproduction apparatus according to an example of the present invention in a state where a tape cassette is mounted but a tape is not loaded (unloading mode)

A magnetic recording and reproduction apparatus according to the present invention includes a chassis section having a first surface for supporting various components and a second surface which is substantially perpendicular to the first surface; a capstan section including a capstan shaft for driving a magnetic tape, a housing for rotatably supporting the capstan shaft, and a motor for driving the capstan shaft; and a pinch roller which is pressed to the capstan shaft by a pressing section for holding the magnetic tape with the capstan shaft and transporting the magnetic tape. The housing of the capstan section is secured to the second surface of the chassis section, such that the capstan shaft is substantially parallel to the second surface of the chassis section and substantially perpendicular to the first surface. Accordingly, the capstan section has no component on a top surface thereof, which reduces the thickness of the magnetic recording and reproduction apparatus.

A pressing force for pressing the pinch roller to the capstan shaft may be generated toward the second surface. In this embodiment, the pressing force of the pinch roller section is received by the second surface.

The magnetic recording and reproduction apparatus may further include a third surface which is substantially perpendicular to and continuous to the first surface and the second surface. In this embodiment, the rigidity of the chassis section is improved.

The second surface may have a pivoting positioning section and a securing section such that the capstan shaft of the capstan section is pivotable in a limited range along the second surface in the state where the housing is temporarily secured to the second surface, and thus the tilt of the housing in the directions parallel to the second surface is adjustable. In this embodiment, the relative positions of the housing and the chassis section are adjustable about the pivoting positioning section.

The center of pivoting of the pivoting positioning section may match a phantom line perpendicular to the second surface and passing through the center of a part of the magnetic tape which is in contact with the capstan shaft. The shifting amount of the capstan shaft for adjusting the position of the capstan shaft is minimized.

The second surface may have a relative position adjusting section such that the relative positions of the capstan shaft of the capstan section and the chassis section are adjusted in a limited range in the state where the housing is temporarily secured to the second surface, and thus the tilt of the housing along a plane parallel to the second surface is adjustable. In this embodiment, the relative positions of the housing and the chassis section are adjustable without a specific component.

The relative position adjusting section may be a cutout provided in at least one position on the second surface in the vicinity of the housing of the capstan section. In this embodiment, a jig is engaged with the cutout, so that the relative position of the capstan section to the second surface of the chassis section can be adjusted.

The second surface has a flapping adjusting section such that the tilt of capstan shaft is in a flapping direction, i.e., the direction perpendicular to the second surface in the state where the housing is temporarily secured to the second surface is adjusted. In this embodiment, the flapping adjustment of the capstan shaft can be performed.

The flapping adjusting section includes a screw hole provided in the second surface and a screw provided through the screw hole so as to press the housing of the capstan section. In this embodiment, the flapping adjustment can be easily performed using the screw.

Hereinafter, the present invention will be described by way of illustrative examples with reference to the FIGS. 1 through 7.

EXAMPLE 1

FIG. 1 is a plan view of a magnetic recording and reproduction apparatus according to the present invention in a state where a tape cassette is mounted but a tape is not loaded (hereinafter, referred to as an "unloading mode"). In FIG. 1, some parts are omitted for the sake of simplicity.

Reference numeral 10 represents a tape cassette, and reference numeral 12 represents a magnetic tape extended in the tape cassette 10. The magnetic tape 12 is wound around an S reel 13 and a T reel 19 accommodated in the tape cassette 10.

Reference numeral 18 represents a sub chassis, to which the tape cassette 10 is attachable. The sub chassis 18 has side walls 62 (FIG. 3; third chassis surfaces) formed by drawing along both sides of a main chassis 50 and projections 64 and 66 respectively provided on the side walls 62. The sub chassis 18 is guided by the projections 64 and 66 being guided along guide grooves 68 and 70 of the main chassis 50. Thus, the sub chassis 18 is movable in directions represented by arrows A and B. The main chassis 50 includes a first chassis surface having a cylinder 46 provided thereon and a second chassis surface. The cylinder 46 is provided for recording information to and/or reproducing information from the magnetic tape 12.

Reference numeral 20 represents an S reel stand and reference numeral 22 represents a T reel stand 22, both of which are rotatably provided on the sub chassis 18. The S reel stand 20 is engageable with the S reel stand 13, and the T reel stand 22 is engageable with the T reel stand 19.

Reference numeral 24 represents a tension arm, which is provided on the sub chassis 18 so as to be pivotable about a tension arm shaft 26. A tension post 28 Is provided at one end of the tension arm 24.

Figure 2:
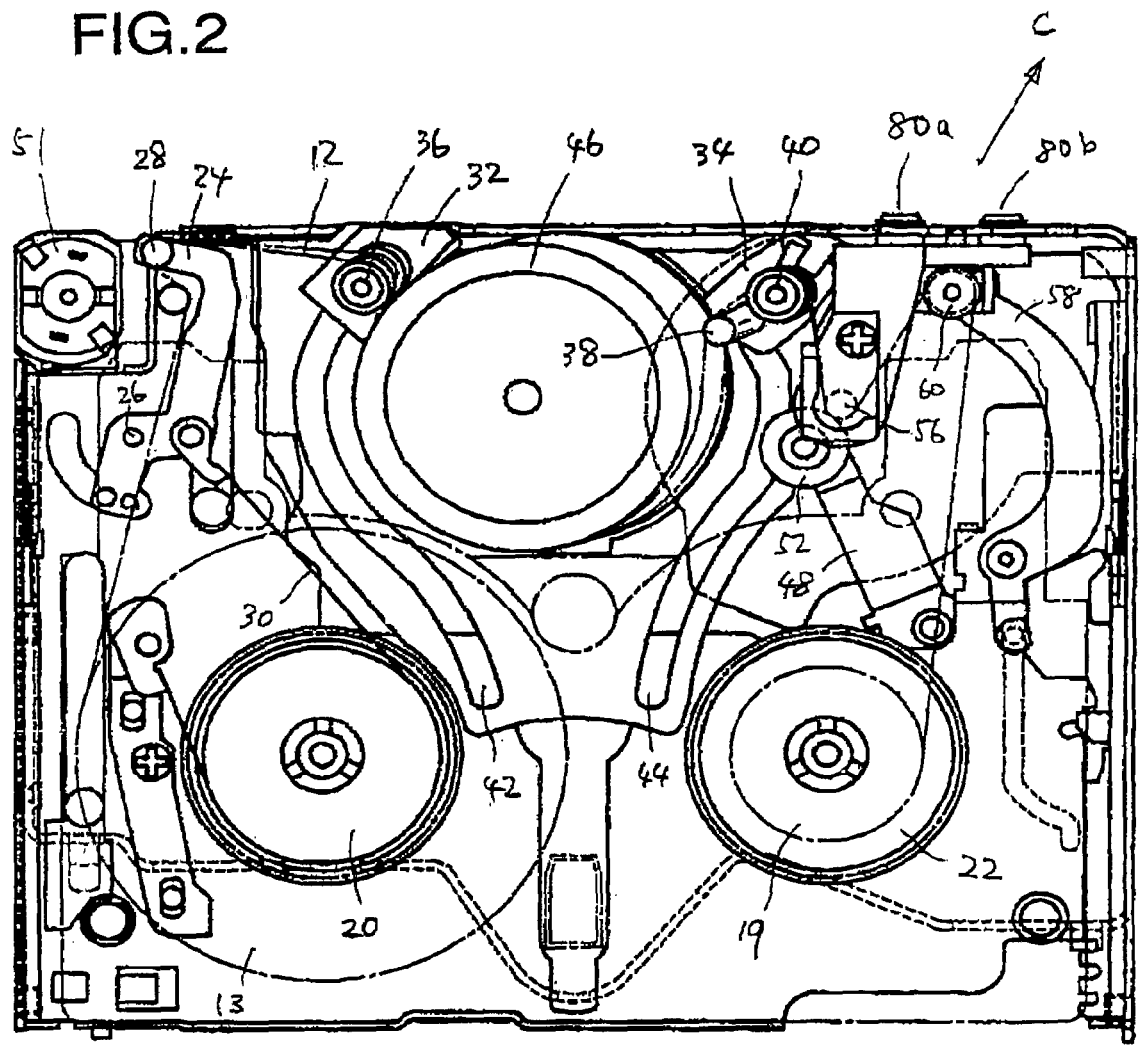
FIG. 2 is a plan view of the magnetic recording and reproduction apparatus shown in FIG. 1 in a tape reproduction or recording state (loading mode)

FIG. 2 shows the magnetic recording and reproduction apparatus shown in FIG. 1 in a tape reproduction or recording state (hereinafter, referred to as a "loading mode"). In this mode, the magnetic tape 12 is wound along the tension post 28. The tension post 28 varies the tension of the tension band 30 in accordance with the tension of the magnetic tape 12, and controls the rotation torque of the S reel stand 20 along which the tension band 30 Is wound.

Reference numeral 32 represents an S boat and reference numeral 34 represents a T boat. The S boat 32 has an S1 post provided thereon, and the T boat 34 has a T1 post 38 and a T2 post 40 provided thereon. In order to obtain the loading mode shown in FIG. 2, the magnetic tape 12 is pulled out from the tape cassette 10 along boat guide grooves 42 and 44 and wound along a cylinder 46.

Reference numeral 48 represents a pinch arm pivotably supported by the main chassis 50. A pinch roller 52 is provided on one end of the pinch arm 48.

In order to obtain the loading mode shown in FIG. 2, the pinch arm 48 is pivoted clockwise and is pressure-contacted by a pressure-contacting spring (not shown) to a capstan shaft 56 of a capstan 54 with the magnetic tape 12 sandwiched there between. The capstan 54 is provided on the main chassis 50.

Reference numeral 58 represents a T3 post arm, which is pivotably supported by the sub chassis 18. In order to obtain the loading mode shown in FIG. 2, a T3 post 60 at a tip of the T3 post arm 58 pulls the magnetic tape 12 off from the tape cassette 10 and winds the magnetic tape 12 along the capstan shaft 56.

The above-described series of operations are driven by cams (not shown) provided for the elements described above while the sub chassis 18 is moved in the directions of arrows A and B by the rotation of a loading motor 51. As a result, the magnetic recording and reproduction apparatus is transformed from the unloading mode shown in FIG. 1 to the loading mode shown in FIG. 2.

Figure 3:
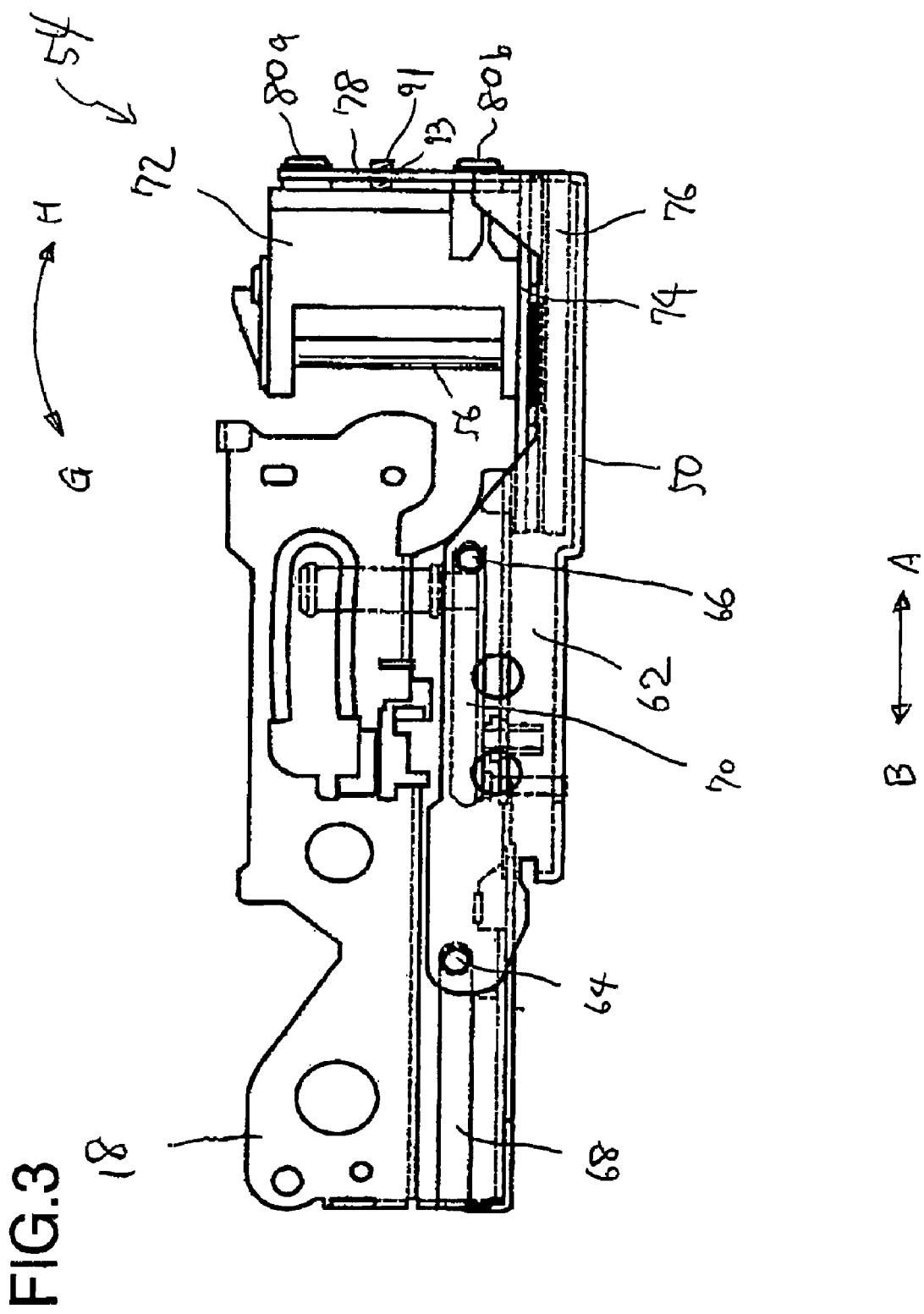
FIG. 3 is a side view of the magnetic recording and reproduction apparatus shown in FIG. 1 in the unloading mode.

The capstan 54 is shown in detail in FIG. 3. A stator 74 of a motor is fixed to a housing 72, and the capstan shaft 76 provided with a rotor 76 is rotatably supported.

Figure 5:
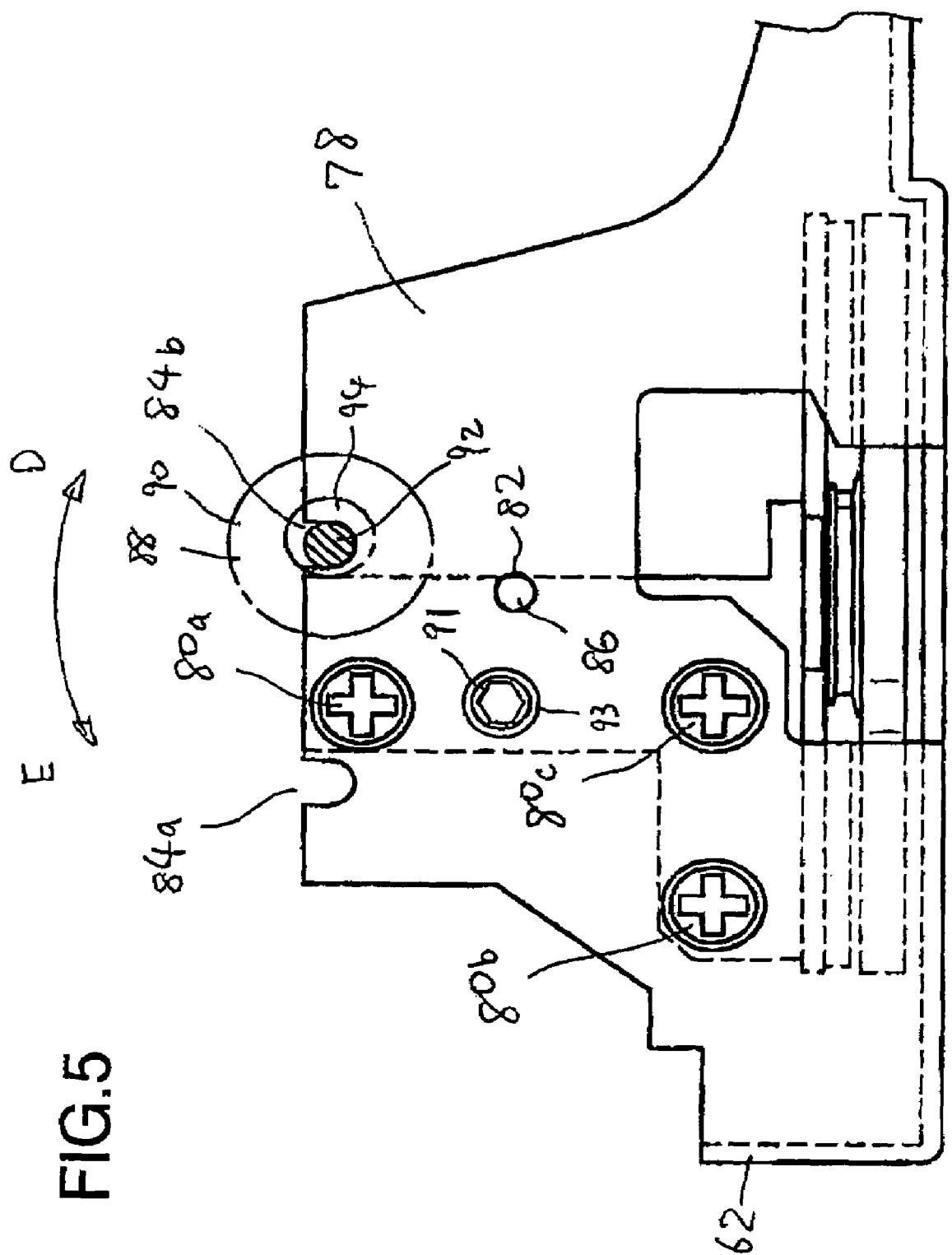
FIG. 5 is a partial rear view of the magnetic recording and reproduction apparatus shown in FIG. 1.

The housing 72 is secured to a rear wall 78 (second chassis surface) of the main chassis 50 by three screws 80*a*, 80*b* and 80*c* (FIG. 5; securing section). The rear wall 78 is formed by drawing.

Therefore, the stator 74 does not have screws or parts of a fixing chassis thereon, and thus the T3 post arm 58 and the pinch arm 48 can be positioned on the stator 74.

The rear wall 78 is formed so as to be continuous with the side walls 62, and thus is highly rigid against a force applied in the direction of arrow A. The side walls 62 are substantially perpendicular to the first chassis surface and the rear wall 78.

Figure 4:
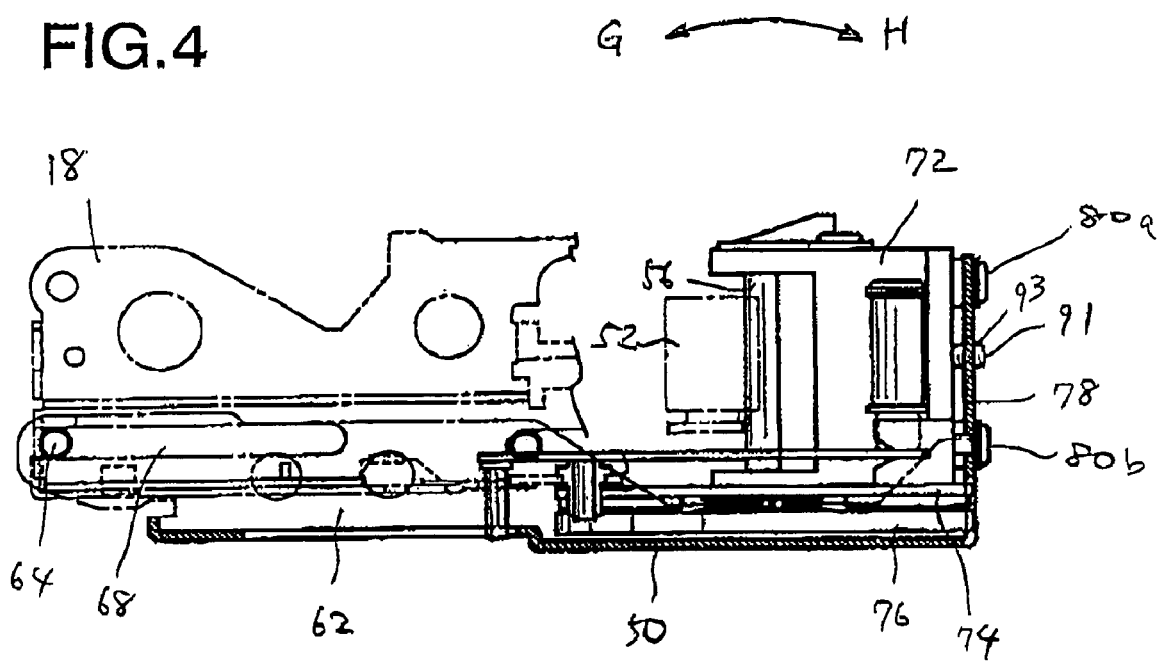
FIG. 4 is a partially cut side view of the magnetic recording and reproduction apparatus shown in FIG. 1 in the loading mode.

As shown in FIGS. 2 and 4, in the loading mode, a large force is generated in a direction represented by arrow C (from the capstan shaft 56 toward the rear wall 78) when the pinch roller 52 is pressure-contacted to the capstan shaft 56. However, owing to the high rigidity of the rear wall 78, the capstan shaft 56 is prevented from falling.

The rear wall 78 has a positioning hole 82 (engaging section) and two adjusting grooves 84*a* and 84*b* (relative position adjusting section). A positioning projection 86 (FIG. 5; pivoting adjusting section) provided on the housing 72 is engaged with the positioning hole 82, and thus the capstan 54 is positioned and secured to the rear wall 78. The adjusting grooves 84*a* and 84*b* are each a cutout formed in a part of the rear wall 78 in the vicinity of the capstan 54.

The capstan 54 includes the above-mentioned pivoting adjusting section for pivoting the capstan 54 along a plane parallel to the rear wall 78 so as to adjust a tilt of the capstan shaft 56.

The tilt of the capstan shaft 56 in tape running directions, i.e., directions represented by arrows D and E needs to be adjusted without damaging the magnetic tape 12.

Figure 6:
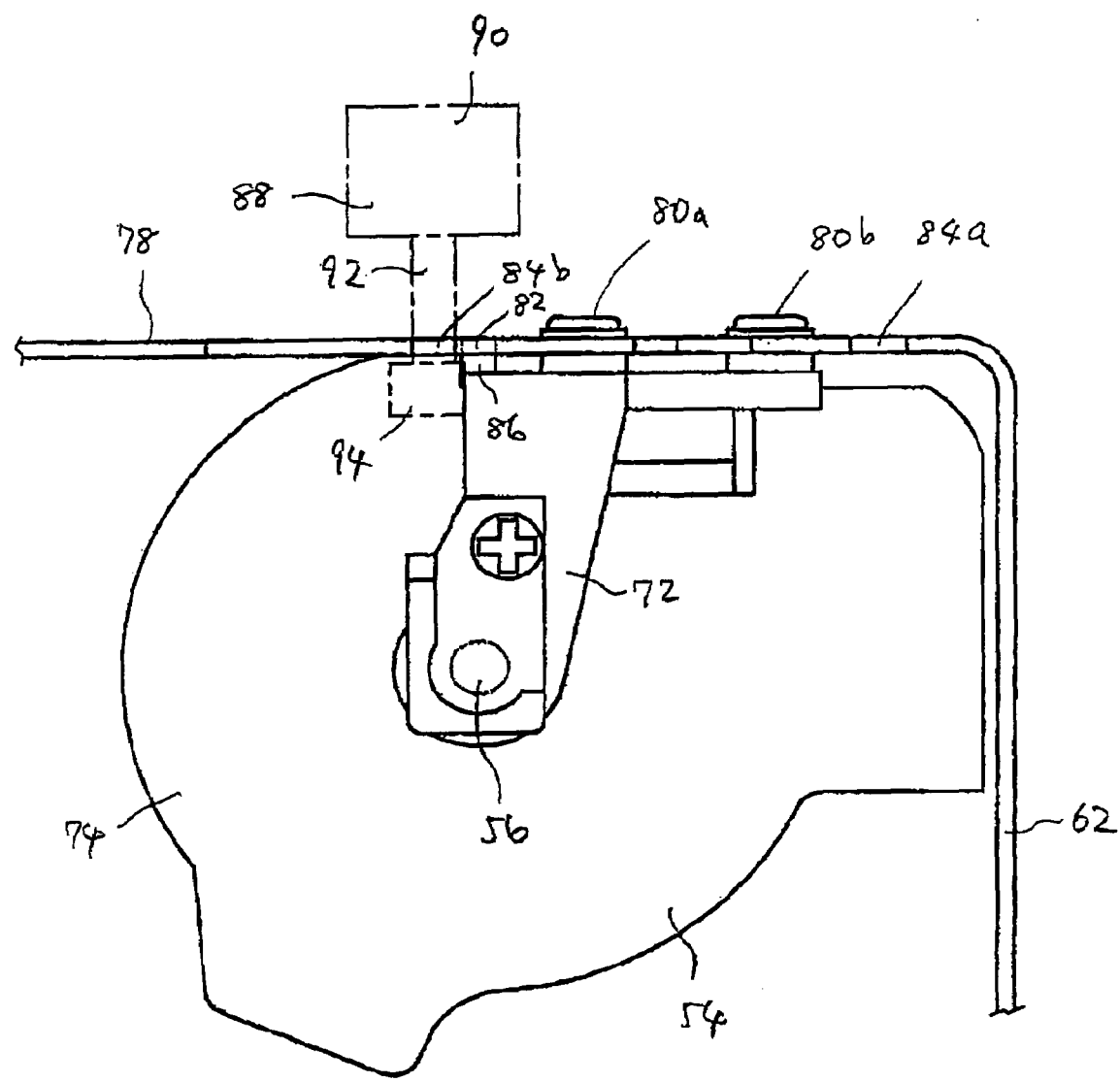
FIG. 6 to a partial plan view of the magnetic recording and reproduction apparatus shown in FIG. 1.

A method for adjusting the tilt will be described with reference to FIGS. 5 and 6.

In the state where the housing 72 Is temporarily secured with the three screws 80*a*, 80*b* and 80*c*, an adjusting eccentric cam 88 is used. The eccentric cam 88 includes a pinch portion 90, a shaft portion 92 and a cam portion 94. The central axis of the pinch portion 90 and the central axis of the shaft portion 92 match each other, but the cam portion 94 is eccentric.

When the pinch portion 90 Is rotated in a prescribed direction with the shaft portion 92 being along the adjusting groove 84*b*, the housing 72 is pressed by the cam portion 94 and thus pivoted in a direction represented by arrow E about the positioning hole 86.

In order to pivot the housing 72 in a direction represented by arrow D, the pinch portion 90 is rotated in a prescribed direction with the shaft portion 92 being along the adjusting groove 84*a*. Once the tilt of the capstan shaft 56 is adjusted, the screws 80*a*, 80*b* and 80*c* are tightened to secure the capstan shaft 56.

Figure 7:
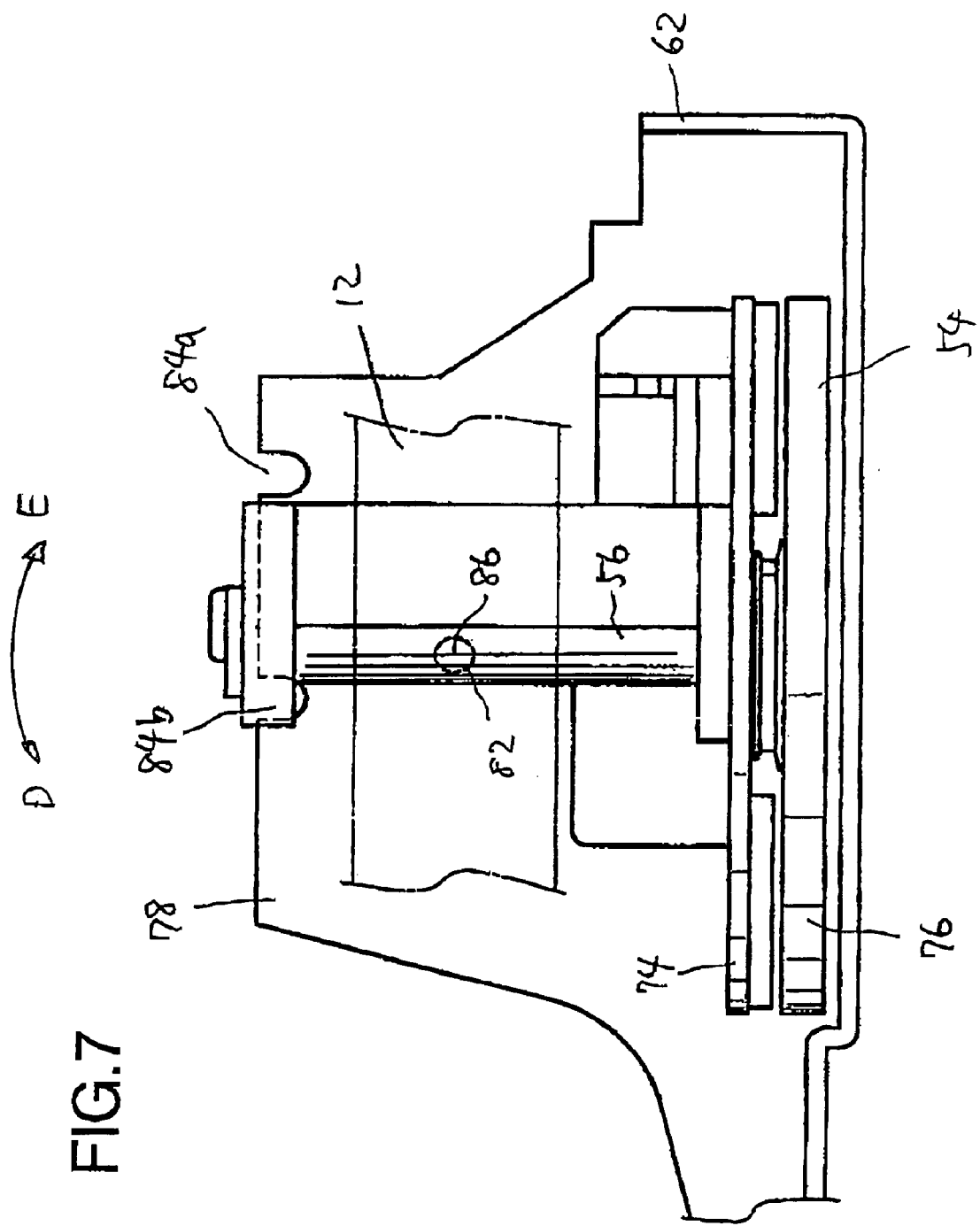
FIG. 7 is a partial front view of the magnetic recording and reproduction apparatus shown in FIG. 1.

As shown in FIG. 7, the positioning projection 86 is provided in the vicinity of the intersection of the center line in the height direction of the magnetic tape 12 and the center line in the width direction of the capstan shaft 56. Therefore, even after the tilt of the capstan shaft 56 to adjusted, the height of the capstan shaft 56 does not change and thus the magnetic tape 12 is not damaged. The center of pivoting of the positioning projection 86 (pivoting adjusting section) substantially matches a phantom line perpendicular to the rear wall 78 and passing through the center of a part of the magnetic tape 12 which is in contact with the pinch roller 52.

In this example, the rear wall 78 and the side walls 62 are formed to be continuous to each other by drawing. Alternatively, the rear wall and the side walls may be separately formed and connected to each other by screws or welding. The same effect is provided.

EXAMPLE 2

In the above example, the tilt of the capstan shaft 56 in the tape running directions, i.e., directions of arrows D and E is adjusted. In this example, adjustment of the tilt of the capstan shaft 56 in flapping directions, i.e., in directions represented by arrows G and H (along a plane perpendicular to the first chassis surface and the rear wall 78 (second chassis surface) will be described with reference to FIGS. 4 and 5.

The rear wall 78 of the main chassis 50 has three screw holes (not shown) used for securing the housing 72 of the capstan 54. A tap hole 93 for an adjusting screw is provided in the vicinity of the screw holes. The tap hole 93 Is provided at a position overlapping the housing 72.

Reference numeral 91 is an adjusting screw, which can be screwed into the tap hole 93. A tip of the adjusting screw 91 reaches the housing 72 of the capstan 54.

In order to adjust the tilt of the capstan shaft 56 in the flapping directions, the adjusting screw 91 is screwed into the tap hole 93 in the state where the screw 80*a* for securing the housing 72 of the capstan 54 is loosened.

The housing 72 is flapped by the adjusting screw 91 and is tilted in the direction of arrow G about the phantom line connecting the screws 80*b* and 80*c*.

When the capstan shaft 56 is tilted at a desired angle, the screw 80*a* is tightened so as to secure the capstan shaft 56.

The adjustment of the capstan shaft 56 in the flapping directions is not always necessary. When it is not necessary, the adjusting screw 91 can be omitted to reduce the number of components.

According to a magnetic recording and reproduction apparatus of the present invention, the second chassis surface is substantially vertical to the first chassis surface on which the cylinder is provided, and the securing section for securing the capstan section to the chassis section is provided on the second surface.

Thus, the securing section for securing the capstan section to the chassis section is provided on the second chassis surface, not on the first chassis section on which the cylinder Is provided. Therefore, the first chassis surface does not need to have a space for the securing section, and the design freedom of the first chassis surface is increased.

As described above, according to the present invention, the capstan is secured to the rear surface of the main chassis. The capstan section has no extra components thereon, which reduces the thickness of the magnetic recording and reproduction apparatus. Since the tilt of the capstan shaft is adjusted with an eccentric cam before the capstan shaft is secured, no extra component for adjustment is required and a simplified production is realized.

Even when the tilt of the capstan shaft in a flapping direction is required, such an adjustment is realized by simply inserting an adjusting screw. When this adjustment is not necessary, the components used for the adjustment can be omitted.

Various other modifications will be apparent to and can be readily made by those skilled in the art without departing from the scope and spirit of this invention. Accordingly, it Is not intended that the scope of the claims appended hereto be limited to the description as set forth herein, but rather that the claims be broadly construed.

What is claimed is:

1. A magnetic recording and reproduction apparatus, comprising:
    a cylinder for recording information to and/or reproducing information from a magnetic tape;
    a chassis section having a first chassis surface having the cylinder provided thereon and a second chassis surface substantially perpendicular to the first chassis surface;
    a capstan section for driving the magnetic tape so as to run, the capstan section being provided on the first chassis surface; and
    a securing section for securing the capstan section to the chassis section, the securing section being provided on the second chassis surface.

2. A magnetic recording and reproduction apparatus according to claim 1, further comprising a pinch roller for pressing the magnetic tape to the capstan section toward the second chassis surface.

3. A magnetic recording and reproduction apparatus according to claim 1, further comprising a third chassis surface substantially perpendicular to the first chassis surface and the second chassis surface.

4. A magnetic recording and reproduction apparatus according to claim 2, wherein:
    the capstan section includes a pivoting adjusting section for pivoting the capstan section along a plane parallel to the second chassis surface so as to adjust a tilt of the capstan section; and
    the second chassis surface has an engaging section engageable with the pivoting adjusting section.

5. A magnetic recording and reproduction apparatus according to claim 4, wherein:
    the pivoting adjusting section pivots in accordance with the pivoting of the capstan section; and
    the center of pivoting of the pivoting adjusting section substantially matches a phantom line perpendicular to the second surface and passing through the center of a part of the magnetic tape which is in contact with the pinch roller.

6. A magnetic recording and reproduction apparatus according to claim 4, further comprising a relative position adjusting section for adjusting the tilt of the capstan section.

7. A magnetic recording and reproduction apparatus according to claim 6, wherein the relative position adjusting section is at least one cutout formed in a part of the second chassis surface in the vicinity of the capstan section.

8. A magnetic recording and reproduction apparatus according to claim 2, further comprising a flapping adjusting section for adjusting a tilt of the capstan section so as to tilt the capstan section along a plane which is perpendicular to the first chassis surface and the second chassis surface.

9. A magnetic recording and reproduction apparatus according to claim 8, wherein:
    the second chassis surface has at least one screw hole;
    the flapping adjusting section is at least one screw; and
    the at least one screw passes through the at least one screw hole to press the capstan section so as to adjust the tilt of the capstan section.

* * * * *